No. 874,471. PATENTED DEC. 24, 1907.
F. W. WHITCHER.
RUBBER HEEL.
APPLICATION FILED OCT. 24, 1906.

Witnesses:
John H. Parker
Alice Tarr

Inventor
Frank W. Whitcher
by Macleod, Calver, Copeland & Dike
Attorneys

UNITED STATES PATENT OFFICE.

FRANK W. WHITCHER, OF BOSTON, MASSACHUSETTS.

RUBBER HEEL.

No. 874,471.        Specification of Letters Patent.        Patented Dec. 24, 1907.

Application filed October 24, 1906. Serial No. 340,250.

*To all whom it may concern:*

Be it known that I, FRANK W. WHITCHER, citizen of the United States, residing at Boston, county of Suffolk, and Commonwealth of Massachusetts, have invented a certain new and useful Improvement in Rubber Heels, of which the following is a specification, reference being had therein to the accompanying drawings.

The invention relates to an improvement in rubber heels. It is a common thing to provide rubber heels with metallic washers or metallic plates embedded therein and formed with nail holes, but as commonly constructed, there are also formed holes extending from the bottom of the rubber heel to register with the holes in the embedded washer or plate to insure that the nails shall pass through the holes in the washer.

The object of the present invention is to provide the heel with a meshed plate, preferably of metal, embedded therein, and so constructed that when the heels are attached to the shoe, the nails will be sure to pass through perforations in the plate without the necessity of guide holes being previously made in the rubber to register with the nail holes in the plate.

The invention will be fully understood from the following description taken in connection with the accompanying drawings, and the novel features are pointed out and clearly defined in the claims at the close of the specification.

Figure 1:
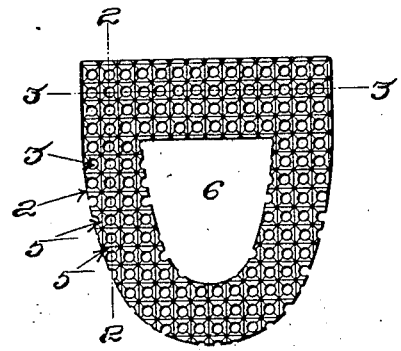
Figure 7:
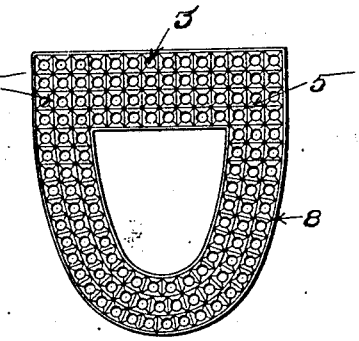
Figure 2:
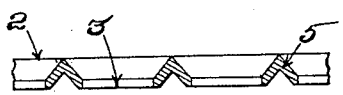
Figure 3:
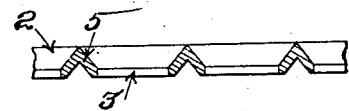
Figure 6:
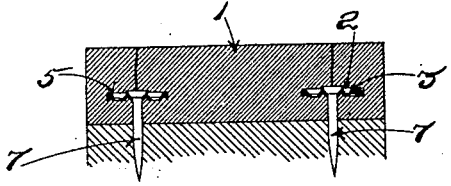
Figure 4:
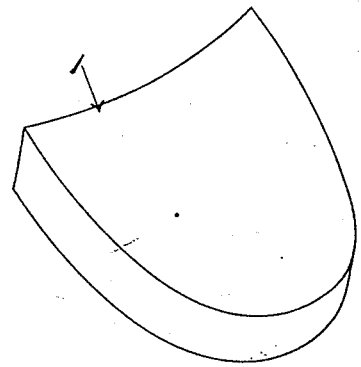
Figure 5:
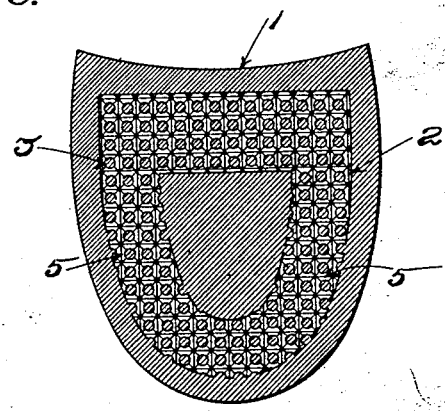

In the drawings,—Figure 1 is a plan of one of the meshed plates detached. Fig. 2 is a section on line 2—2 of Fig. 1, enlarged. Fig. 3 is a section on line 3—3 of Fig. 1, enlarged. Fig. 4 is a perspective of a heel, the plate being wholly hidden by the rubber. Fig. 5 is a horizontal section, showing the plate in the heel. Fig. 6 is a vertical section showing the heel with nails driven through the perforations in the plate into the leather heel. Fig. 7 is a plan of a plate showing the holes disposed in a somewhat different order from that shown in Fig. 1.

Referring to the drawings,—1 represents the rubber heel, and 2 represents the meshed plate which is embedded in the heel, the plate being molded or vulcanized therein. The plate 2 is meshed or provided with numerous perforations 3 for the passage of the shanks of the nails 7 which are used for attaching the heel to the shoe. These perforations are close together, being more numerous than the nails to be employed in attaching the heel to the shoe, and are separated from each other by narrow partitions 5 tapering toward the wearing surface of the heel, preferably to an edge, so that when one of the securing nails is driven into the heel, if by chance it should not register exactly with one of the holes, it would strike either on the ridge of the partition or on the sloping side, and will thereby be deflected so that it will enter one of the holes in the plate instead of being either entirely obstructed by the plate or puncturing another hole in the plate. The sloping sides of the perforations will form seats for the heads of the nails 7. With this form of construction, it is not necessary to have previously formed holes in the rubber to register with the holes in the plate, but the nail may be driven in anywhere in the portion covered by the plate, and it will be sure of entering some one of the holes in the plate. After the nail is driven in, the hole formed in the rubber will close up behind the nail, as shown in Fig. 6.

Inasmuch as the nails are usually driven in a row near the edge of the heel, the center portion 6 of the plate may be left open.

The plate may be formed in any way desired, either by casting with the holes formed therein in the casting, or the plate may be struck up with a die to form the perforations and the ridged partitions. It is preferable, however, that the plate should be integral instead of being woven from wire or strips. By making it integral, if by chance one of the partitions should be broken by a nail or otherwise, the other partitions will still serve to brace the plate on the sides of the meshes. If formed by striking up from a plate, the partitions will be V-shaped. It will be observed that in this form of construction, the corners at the junction of the holes all have downwardly sloping sides.

If the partitions are very narrow, the sides need not be made sloping.

In the form of plate shown in Figs. 1 and 5, it will be noted that the perforations are all disposed in straight lines, and the partitions are also in straight lines, so that where the edge of the plate is curved, it in some places cuts across the holes, but the holes thus cut across would be outside of the line of the nails, and where thus cut across the walls are sloping.

In the modification shown in Fig. 7, the holes are made in lines parallel with the contour of the plate, therefore following a curved line and some of the partitions will also be curved. With this form of construction, there are no broken holes along the margin, but there is a selvage 8 entirely around the plate and this selvage is V-shaped or has sloping walls.

What I claim is:

1. A rubber heel provided with a meshed plate embedded therein, said plate being integral in itself and formed with a large number of holes in close proximity to one another more than the number of nails to be used in attaching the heel to the shoe, the intermediate portion of the plate between the perforations being constructed to form partitions between the holes on all sides thereof with sloping sides and narrow edges, whereby nails driven into the heel at any point against the mesh plate will be deflected into one of the holes in the mesh plate.

2. A rubber heel provided with a meshed plate embedded therein formed with holes for the passage of nails, the partitions between the perforations being V-shaped in cross-section towards the wearing surface of the heel.

In testimony whereof I affix my signature, in presence of two witnesses.

FRANK W. WHITCHER.

Witnesses:
 WILLIAM A. MACLEOD,
 ALICE H. MORRISON.